United States Patent
Hisaminato et al.

(10) Patent No.: US 8,161,940 B2
(45) Date of Patent: Apr. 24, 2012

(54) SPARK IGNITION TYPE INTERNAL COMBUSTION ENGINE

(75) Inventors: Naoto Hisaminato, Susono (JP); Daisuke Akihisa, Susono (JP); Eiichi Kamiyama, Mishima (JP); Yukihiro Nakasaka, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 260 days.

(21) Appl. No.: 12/673,363

(22) PCT Filed: Nov. 6, 2008

(86) PCT No.: PCT/JP2008/070643
§ 371 (c)(1),
(2), (4) Date: Feb. 12, 2010

(87) PCT Pub. No.: WO2009/061004
PCT Pub. Date: May 14, 2009

(65) Prior Publication Data
US 2010/0282216 A1      Nov. 11, 2010

(30) Foreign Application Priority Data
Nov. 6, 2007   (JP) ................. 2007-288517

(51) Int. Cl.
*F02D 9/00*      (2006.01)
*F02D 15/00*     (2006.01)
(52) U.S. Cl. ............... 123/403; 123/48 C; 123/78 C; 123/90.15
(58) Field of Classification Search .... 123/90.15–90.18, 123/48 R–48 D, 78 R–78 F, 403
See application file for complete search history.

(56) References Cited

U.S. PATENT DOCUMENTS
5,996,560 A * 12/1999 Schechter ............... 123/556
(Continued)

FOREIGN PATENT DOCUMENTS
JP      A-11-311135      11/1999
(Continued)

OTHER PUBLICATIONS
Written Reply to Written Opinion of International Searching Authority in International Application No. PCT/JP2008/070643; dated Sep. 4, 2009.
(Continued)

*Primary Examiner* — Erick Solis
(74) *Attorney, Agent, or Firm* — Oliff & Berridge, PLC

(57) ABSTRACT

Provided is a spark ignition type internal combustion engine comprising a variable compression ratio mechanism (A) capable of changing a mechanical compression ratio, and a variable valve timing mechanism (B) capable of controlling the closing timing of an intake valve. At an engine low-load running time, the mechanical compression ratio is made so higher than that at an engine high-load running time that the expansion ratio may be 20 or higher. In case the vacuum in an engine intake passage is lower than the required vacuum, the opening of a throttle valve (17) is reduced, and the valve closing timing of the intake valve is controlled so that the intake air in a quantity according to the engine load may be fed to the inside of a combustion chamber in accordance with the opening of the throttle valve. As a result, a brake booster or the like can be properly activated in the internal combustion engine having its mechanical compression ratio enlarged at the engine low-load running time.

10 Claims, 11 Drawing Sheets

U.S. PATENT DOCUMENTS

| | | | |
|---|---|---|---|
| 6,397,814 B1 | 6/2002 | Nagaishi et al. | |
| 6,792,924 B2 * | 9/2004 | Aoyama et al. | 123/568.14 |
| 6,990,936 B2 * | 1/2006 | Arai et al. | 123/90.15 |
| 2003/0116131 A1 | 6/2003 | Majima et al. | |
| 2005/0247286 A1 * | 11/2005 | Weber et al. | 123/316 |

FOREIGN PATENT DOCUMENTS

| | | |
|---|---|---|
| JP | A-2001-159329 | 6/2001 |
| JP | A-2003-035178 | 2/2003 |
| JP | A-2004-218522 | 8/2004 |
| JP | A-2007-071046 | 3/2007 |
| JP | A-2007-239550 | 9/2007 |

OTHER PUBLICATIONS

International Preliminary Report on Patentability in International Application No. PCT/JP2008/070643; dated Jul. 1, 2010.

International Search Report issued in International Application No. PCT/JP2008/070643 on Dec. 22, 2008 (with English-language translation).

* cited by examiner

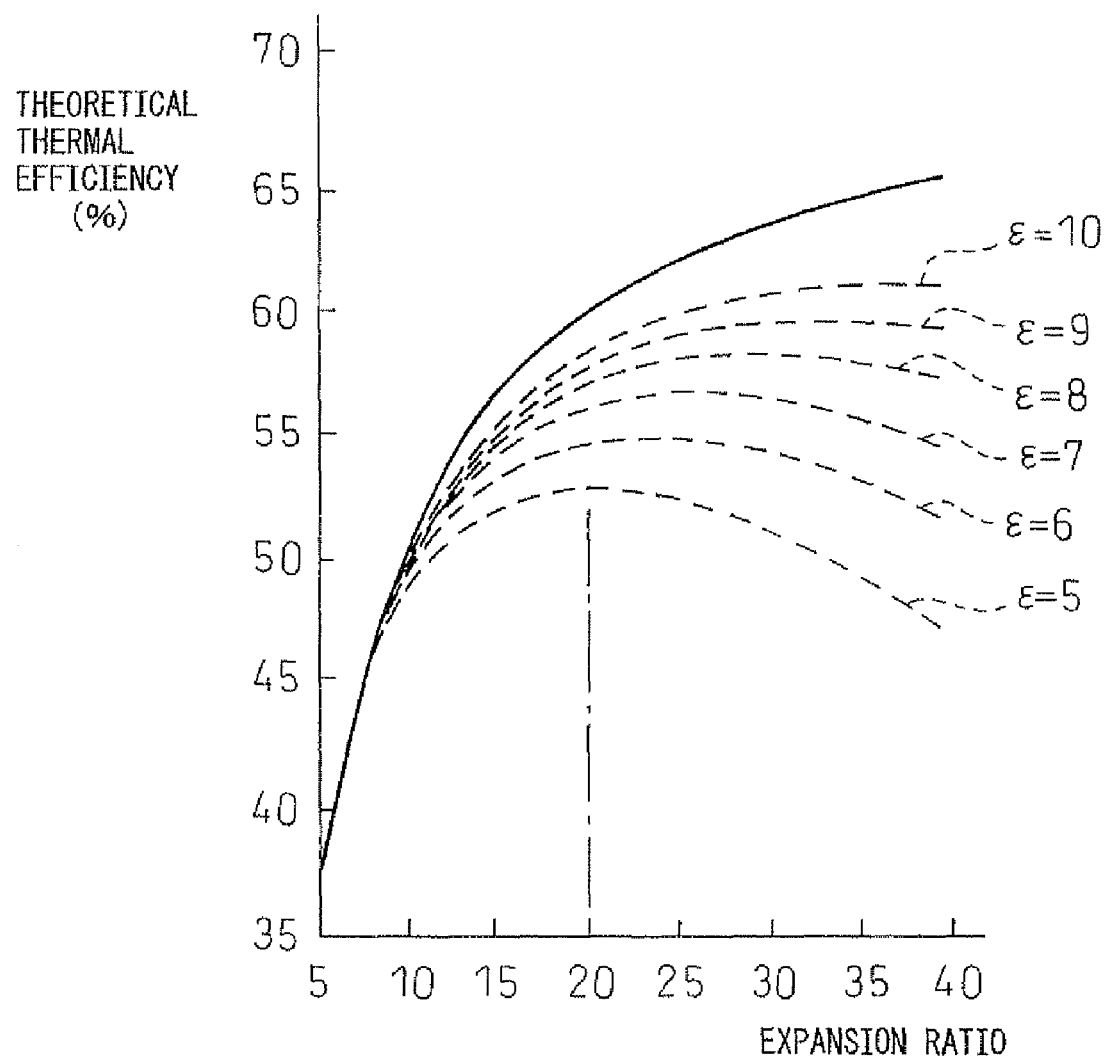

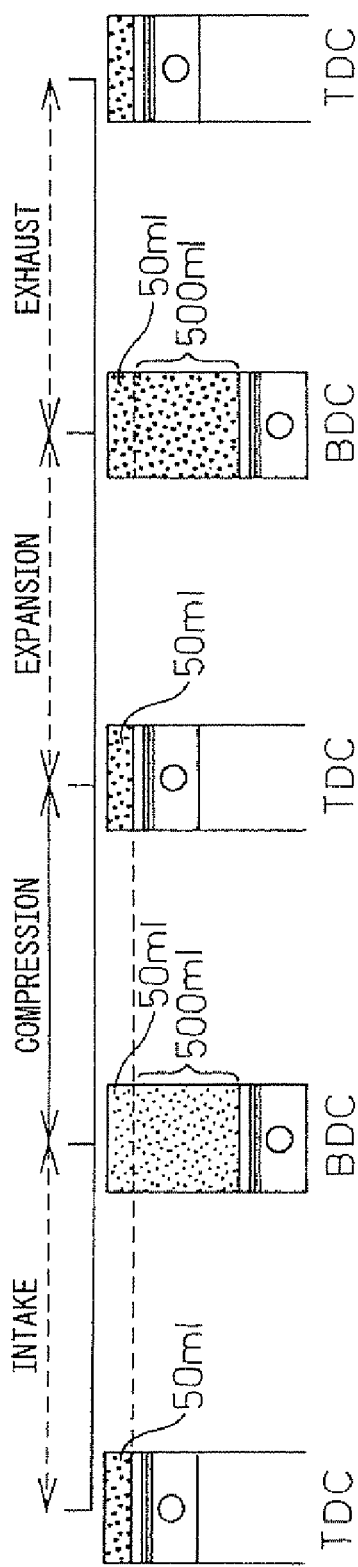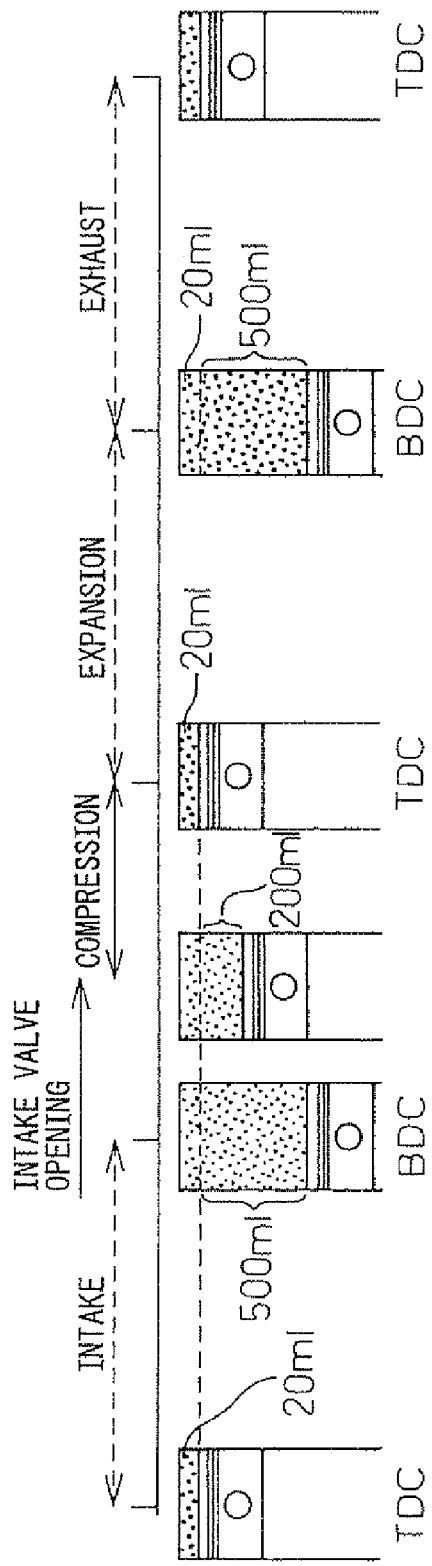

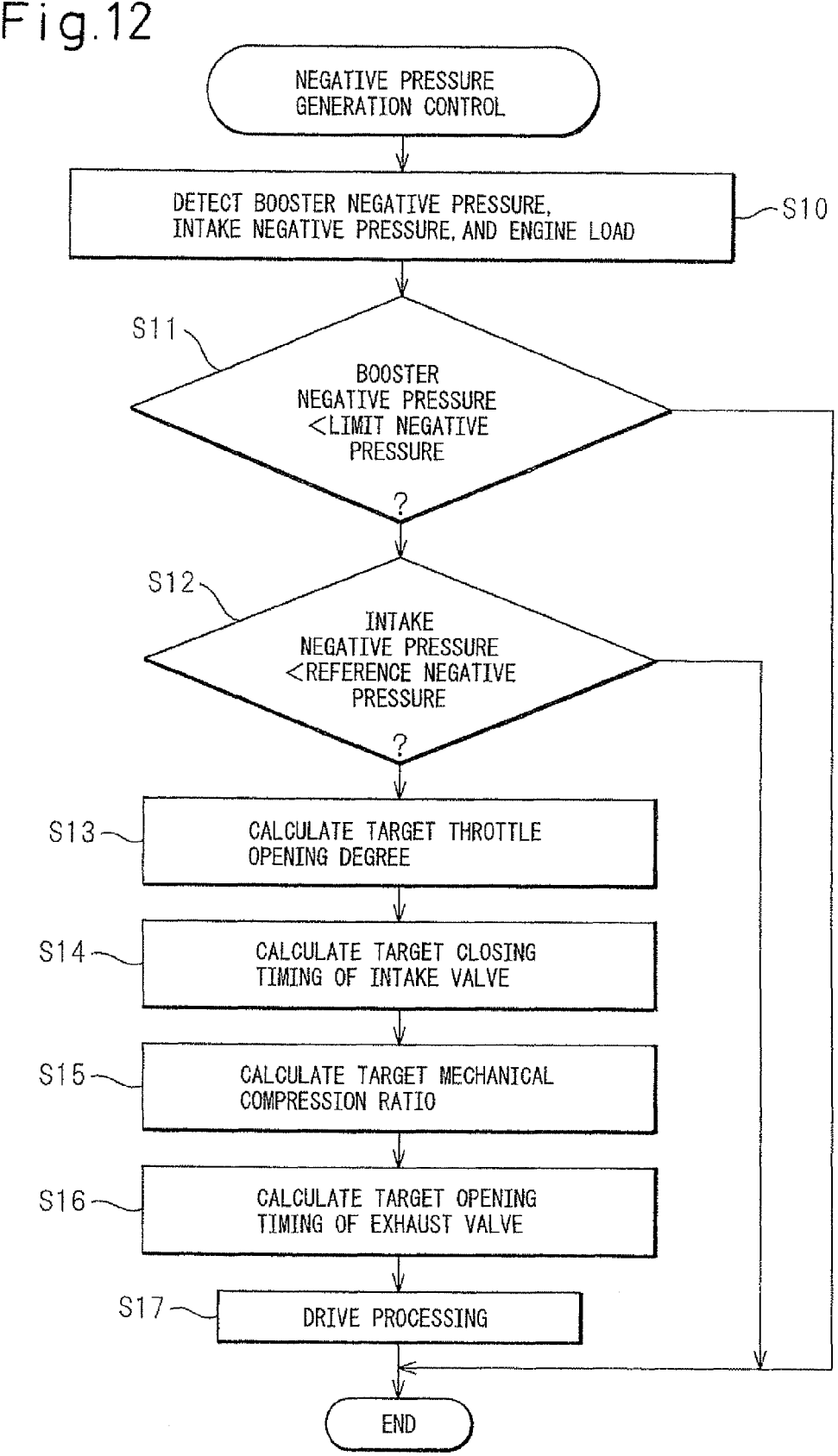

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change the mechanical compression ratio and a variable valve timing mechanism able to control the closing timing of the intake valve, performing a supercharging action by a supercharger at the time of engine medium load operation and at the time of engine high load operation, and increasing the mechanical compression ratio and retarding the closing timing of the intake valve as the engine load becomes lower in the state holding the actual compression ratio constant at the time of engine medium and high load operation (for example, see Japanese Patent Publication (A) No. 2004-218522).

In this regard, in the internal combustion engine disclosed in Japanese Patent Publication (A) No. 2004-218522, at the time of engine low load operation, the mechanical compression ratio is made larger, the closing timing of the intake valve is retarded, and further no supercharging is performed. When retarding the closing timing of the intake valve in the engine low load operation region in this way, to make the intake air amount supplied into the combustion chamber the target intake air amount, it is necessary to make the opening degree of the throttle valve larger to a certain extent. In this way, if the opening degree of the throttle valve is large at the time of engine low load operation, the negative pressure generated in the engine intake passage at a downstream side of the throttle valve (for example, surge tank) is not that large.

On the other hand, for example, a brake booster, a canister for purge control, and other devices utilizing negative pressure (hereinafter referred to as "negative pressure utilizing devices") usually are driven utilizing the negative pressure generated in an engine intake passage. For this reason, if sufficient negative pressure is not generated inside the engine intake passage at the time of engine low load operation as explained above, it is no longer possible to suitably operate these negative pressure utilizing devices. In particular, a brake booster requires a relatively large negative pressure to generate sufficient braking force, so generation of a large negative pressure in the engine intake passage becomes necessary.

In this regard, as explained above, in the internal combustion engine disclosed in Japanese Patent Publication (A) No. 2004-218522, it is not possible to generate a large negative pressure in the engine intake passage at least at the time of engine low load operation and therefore it is not possible to suitably operate negative pressure utilizing devices.

DISCLOSURE OF THE INVENTION

The present invention was made in consideration of the above problem and has as its object to provide an internal combustion engine increasing the mechanical compression ratio and retarding the closing timing of the intake valve at the time of engine low load operation which can suitably operate negative pressure utilizing devices without changing the engine operating state.

The present invention provides, as means for solving the above problems, a spark ignition type internal combustion engine described in the claims of the claim section.

In first aspect of the present invention, a spark ignition type internal combustion engine is provided with a variable valve timing mechanism able to control the closing timing of the intake valve, wherein when a negative pressure in an engine intake passage is smaller than a requested negative pressure, an opening degree of a throttle valve is made smaller so that the negative pressure in the engine intake passage becomes the requested negative pressure or more and a closing timing of the intake valve is controlled so that an amount of intake air corresponding to the engine load is supplied into a combustion chamber in accordance with the opening degree of the throttle valve.

In this aspect, when there is a negative pressure request, the opening degree of the throttle valve is made smaller and in accordance with this the closing timing of the intake valve is controlled. If the opening degree of the throttle valve is made smaller, the negative pressure in the engine intake passage is increased. If the closing timing of the intake valve is controlled in accordance with the opening degree of the throttle valve, the amount of intake air corresponding to the engine load can be supplied to the combustion chamber even if the degree of the throttle valve is made smaller.

In the second aspect of the present invention, the engine is further provided with a variable compression ratio mechanism able to change the mechanical compression ratio, wherein when making the opening degree of the throttle valve so that the above negative pressure in the engine intake passage becomes the requested negative pressure or more and controlling the closing timing of the intake valve so that an amount of intake air corresponding to the engine load is supplied in the combustion chamber in accordance with the opening degree of the throttle valve, the mechanical compression ratio is made smaller to lower the compression end pressure.

In the third aspect of the present invention, the mechanical compression ratio in the case where the negative pressure in the engine intake passage becomes the requested negative pressure or more due to reduction of the opening degree of the above throttle valve is made smaller than the case where the negative pressure in the engine intake passage is smaller than the requested negative pressure.

In the fourth aspect of the present invention, the mechanical compression ratio in the case where the negative pressure in the engine intake passage becomes the requested negative pressure or more due to reduction of the opening degree of the above throttle valve is set so that the compression end temperature becomes substantially the same as the compression end temperature in the case where the negative pressure in the engine intake passage is smaller than the requested negative pressure.

In the fifth aspect of the present invention, when the negative pressure in the engine intake passage is the requested negative pressure or more, the expansion rate is 20 or more at the time of engine low load operation.

In the sixth aspect of the present invention, the actual compression ratio at the time of engine low load operation is made substantially the same compression ratio as the time of engine medium and high load operation.

In the seventh aspect of the present invention, wherein when the negative pressure in the intake passage is the requested negative pressure or more, the closing timing of the intake valve is made to move in a direction away from intake bottom dead center until the limit closing timing able to control the amount of intake air supplied in the combustion chamber along with a reduction in the engine load.

In the eighth aspect of the present invention, in the region where the load is higher than the engine load when the closing timing of the intake valve reaches the above limit closing timing, the amount of intake air supplied in the combustion chamber is controlled not by the throttle valve, but by changing the closing timing of the intake valve.

In the ninth aspect of the present invention, in the region where the load is higher than the engine load when the closing timing of the intake valve reaches the above limit closing timing, the above throttle valve is held in the fully opened state.

In the tenth aspect of the present invention, in the region where the load is lower than the engine load when the closing timing of the intake valve reaches the above limit closing timing, the amount of intake air supplied in the combustion chamber is controlled by the above throttle valve.

In the eleventh aspect of the present invention, when the negative pressure in the engine intake passage is the requested negative pressure or more, the mechanical compression ratio is made the maximum mechanical compression ratio at the time of engine low load operation.

Below, the present invention will be understood more clearly from the attached drawings and the description of the preferred embodiments of the present invention.

BRIEF DESCRIPTION OF DRAWINGS

FIG. 7 is a view showing the relationship of the theoretical thermal efficiency and expansion ratio.

FIG. 8A and FIG. 8B are views for explaining an ordinary cycle and superhigh expansion ratio cycle.

FIG. 12 is a flowchart showing a control routine for negative pressure generation control.

BEST MODE FOR CARRYING OUT THE INVENTION

Figure 1:
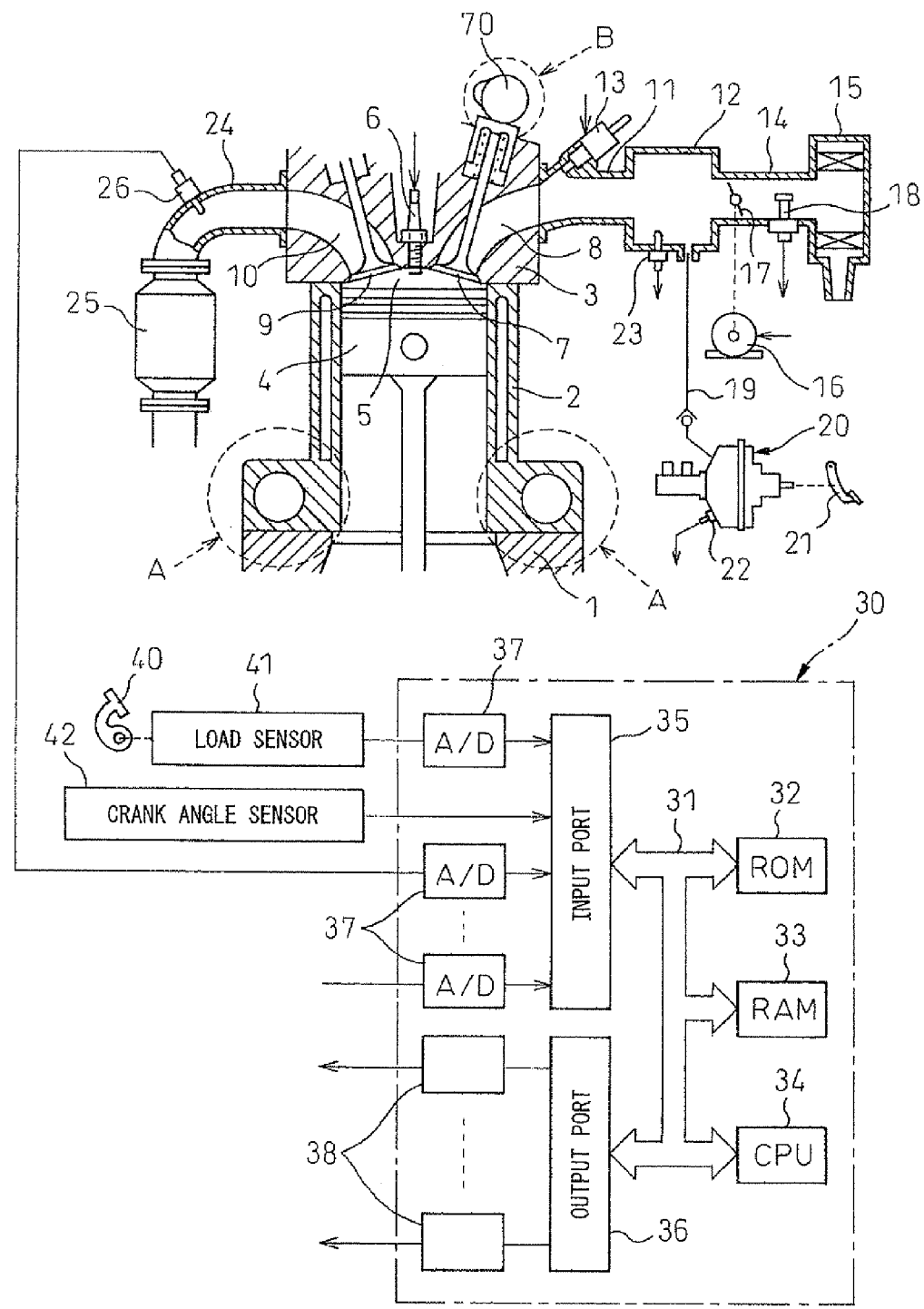
FIG. 1 is an overall view of a spark ignition type internal combustion engine.

Below, embodiments of the present invention will be explained with reference to the drawings. Note that the same or similar components in the drawings are assigned the same notations. FIG. 1 is a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, and the intake duct 14 is provided inside it with a throttle valve 17 driven by an actuator 16 and an intake air amount detector 18 using for example a hot wire. The surge tank 12 is connected to a negative pressure conducting pipe 19, which is connected to a brake booster 20. The brake booster 20 is connected to a brake pedal 21, and provided inside it is a negative pressure sensor 22 for detecting negative pressure in the brake booster. Further, provided inside the surge tank 12 is with a pressure sensor 23 for detecting pressure within the surge tank 12. On the other hand, the exhaust port 10 is connected through an exhaust manifold 24 to a catalytic converter 25 housing for example a three-way catalyst. The exhaust manifold 24 is provided inside it with an air-fuel ratio sensor 26.

Further, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center. The internal combustion engine is further provided with a variable valve mechanism B able to change the closing timing of the intake valve 7 so as to change the start timing of actual compression action.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 26 are input through corresponding AD converters 37 to the input port 35. Further, the accelerator pedal 40 is connected to a load sensor 41 generating an output voltage proportional to the amount of depression of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the corresponding drive circuits 38 to a spark plug 6, fuel injector 13, throttle valve drive actuator 16, variable compression ratio mechanism A and variable valve timing mechanism B.

Figure 2:
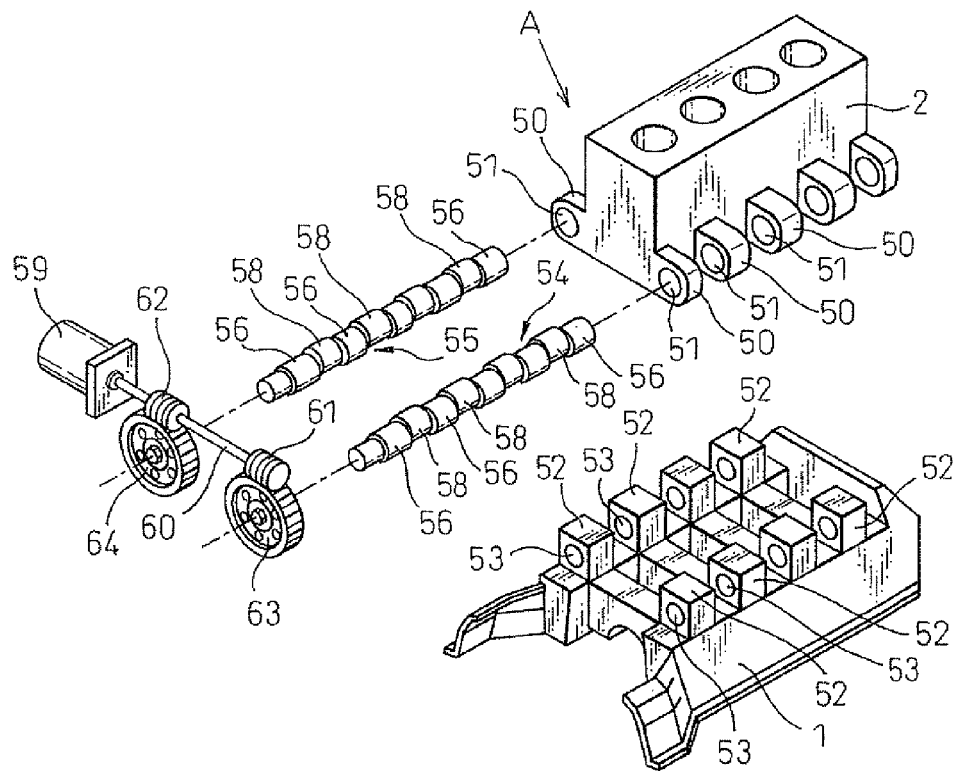
FIG. 2 is an exploded perspective view of a variable compression ratio mechanism.
Figure 3A:
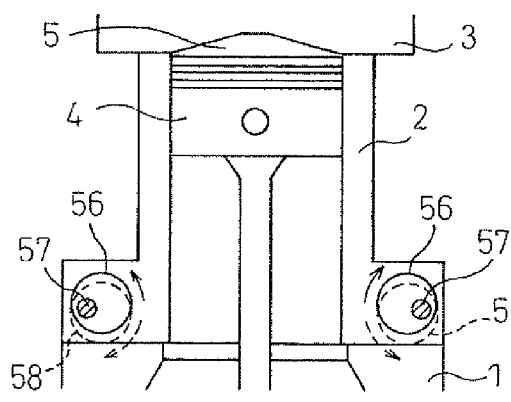
FIG. 3A and FIG. 3B are side cross-sectional views of an internal combustion engine schematically illustrated.
Figure 3B:
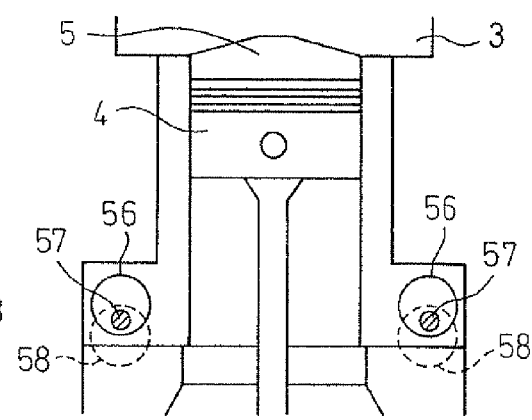

FIG. 2 is an exploded perspective view of the variable compression ratio mechanism A shown in FIG. 1, while FIG. 3A and FIG. 3B are side cross-sectional views of the internal combustion engine schematically illustrated. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3A and FIG. 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3B, when the eccentric shafts 57 move toward the bottom center, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55, respectively. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3B shows an example. Any type of variable compression ratio mechanism may be used.

Figure 4:
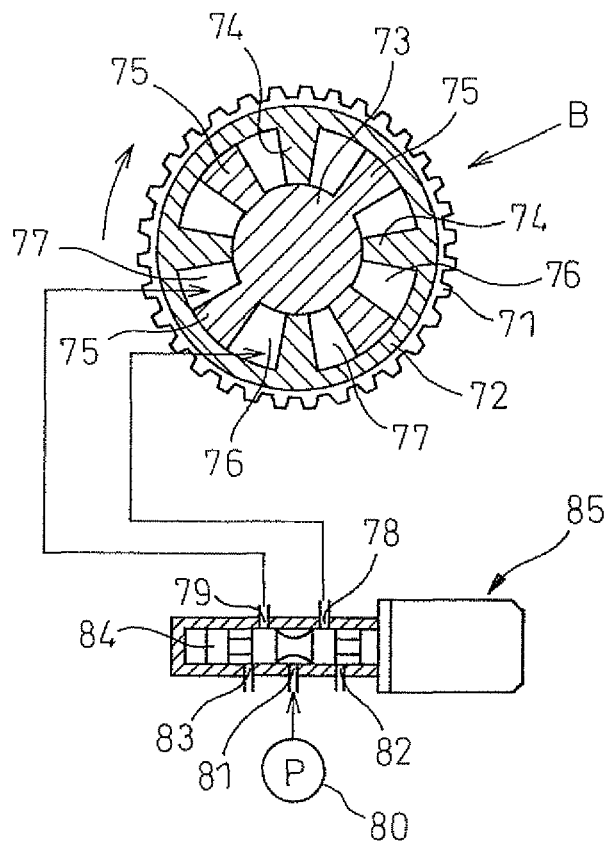
FIG. 4 is a view showing a variable valve timing mechanism.

On the other hand, further, FIG. 4 shows a variable valve timing mechanism B attached to the end of the cam shaft 70 for driving the intake valve 7 in FIG. 1. As shown in FIG. 4, the variable valve timing mechanism B is provided with a timing pulley 71 made to rotate by an engine crank shaft through a timing belt in the arrow direction, a cylindrical housing 72 rotating together with the timing pulley 71, a rotation shaft 73 able to rotate together with the cam shaft 70 and rotate relative to the cylindrical housing 72, a plurality of partitions 74 extending from an inside circumference of the cylindrical housing 72 to an outside circumference of the rotation shaft 73, and vanes 75 extending between the partitions 74 from the outside circumference of the rotation shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 85. This working oil feed control valve 85 is provided with hydraulic ports 78, 79 connected to the hydraulic chambers 76, 77, a feed port 81 for feeding working oil discharged from a hydraulic pump 80, a pair of drain ports 82, 83, and a spool valve 84 for controlling connection and disconnection of the ports 78, 79, 81, 82, 83.

To advance the phase of the cams of the cam shaft 70, the spool valve 84 is made to move right in FIG. 4, working oil fed from the feed port 81 is fed through the hydraulic port 78 to the advancing use hydraulic chambers 76, and working oil in the retarding use hydraulic chambers 77 is drained from the drain port 83. At this time, the rotation shaft 73 is made to rotate relative to the cylindrical housing 72 in the arrow direction.

As opposed to this, to retard the phase of the cams of the cam shaft 70, the spool valve 84 is made to move left in FIG. 4, working oil fed from the feed port 81 is fed through the hydraulic port 79 to the retarding use hydraulic chambers 77, and working oil in the advancing use hydraulic chambers 76 is drained from the drain port 82. At this time, the rotation shaft 73 is made to rotate relative to the cylindrical housing 72 in the direction opposite to the arrow direction.

When the rotation shaft 73 is made to rotate relative to the cylindrical housing 72, if the spool valve 84 is returned to the neutral position shown in FIG. 4, the operation for relative rotation of the rotation shaft 73 is ended, and the rotation shaft 73 is held at the relative rotational position at that time. Therefore, it is possible to use the variable valve timing mechanism B so as to advance or retard the phase of the cam of the cam shaft 70 by exactly the desired amount.

Figure 5:
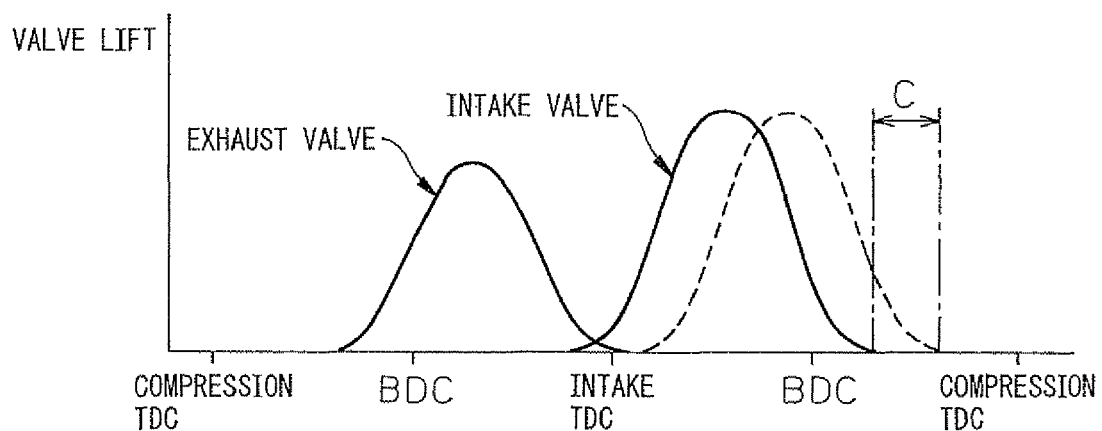
FIG. 5 is a view showing an amount of lift of an intake valve and exhaust valve.

In FIG. 5, the solid line shows the case where the phase of the cams of the cam shaft 70 is maximally advanced by the variable valve timing mechanism B, and the broken line shows the case where the phase of the cams of the cam shaft 70 is maximally retarded. Therefore, the opening period of the intake valve 70 can be freely set between the period shown in the solid line and the period shown in the broken line in FIG. 5, and thus the closing timing of the intake valve can be set to a given crank angle within the range indicated by the arrow C in FIG. 5.

Note that the variable valve timing mechanism B shown in FIGS. 1 and 4 shows an example. It is also possible to use various types of variable valve timing mechanism, such as a variable valve timing mechanism able to change the closing timing of the intake valve with the opening timing thereof maintained constant. Further, although the variable valve timing mechanism B is used for changing the start timing of the actual compression action in the present invention, it is also possible to use various types of actual compression action start timing changing mechanisms able to change the start timing of actual compression action, other than the variable valve timing mechanism.

Figure 6A:
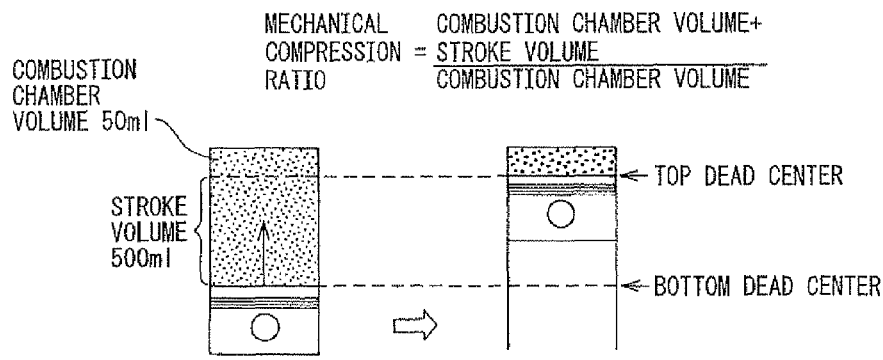
FIG. 6A to FIG. 6O are views for explaining a mechanical compression ratio, an actual compression ratio and an expansion ratio.
Figure 6B:
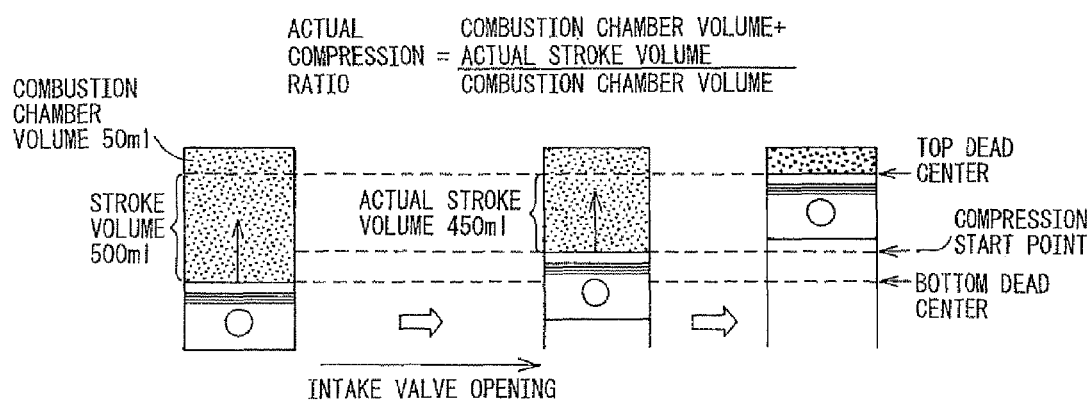
Figure 6C:
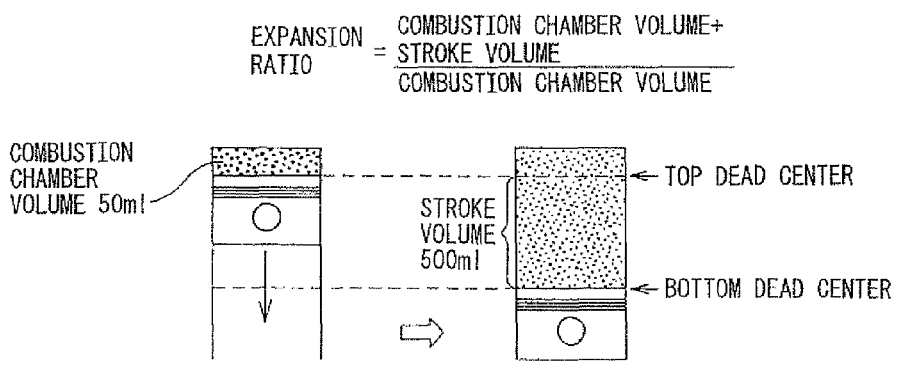

Next, the meaning of the terms used in the present application will be explained with reference to FIG. 6A to FIG. 6C. Note that FIG. 6A, FIG. 6B and FIG. 6C show for explanatory purposes an engine with a volume of the combustion chambers of 50 ml and a stroke volume of the piston of 500 ml. In these FIG. 6A, FIG. 63 and FIG. 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston at the time of a compression stroke and combustion chamber volume. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual compression ratio. This actual compression ratio is a value determined from the combustion chamber volume and the actual stroke volume of the piston from when the compression action is actually started to when the piston reaches top dead center. This actual compression ratio is expressed by (combustion chamber volume+actual stroke volume)/combustion chamber volume. That is, as shown in FIG. 63, even if the piston starts to rise in the compression stroke, no compression action is performed while the intake valve is opened. The actual compression action is started after the intake valve closes. Therefore, the actual compression ratio is expressed as above using the actual stroke volume. In the example shown in FIG. 6B, the actual compression ratio becomes (50 ml+450 ml)/50 ml=10.

FIG. 6C explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6C, this expansion ratio becomes (50 ml+500 ml)/50 ml=11.

Next, the most basic features of the present invention will be explained with reference to FIG. 7, FIG. 8A and FIG. 8B. Note that FIG. 7 shows the relationship between the theoretical thermal efficiency and the expansion ratio, while FIG. 8A and FIG. 8B show a comparison between the ordinary cycle and superhigh expansion ratio cycle used selectively in accordance with the load in the present invention.

FIG. 8A shows the ordinary cycle wherein the intake valve closes near the bottom dead center and the compression action by the piston is started from near substantially compression bottom dead center. In the example shown in this FIG. 8A as well, in the same way as the examples shown in FIGS. 6A, 6B and 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line of $\epsilon=10$ in FIG. 7 shows the theoretical thermal efficiency in the case of fixing the actual compression ratio at 10 and raising the expansion ratio in that state. It is learned that the amount of rise of the theoretical thermal efficiency when raising the expansion ratio in the state where the actual compression ratio is maintained at a low value in the above way and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8B shows an example of the case when using the variable compression ratio mechanism A and variable valve timing mechanism B to maintain the actual compression ratio at a low value and raise the expansion ratio.

Referring to FIG. 8B, in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8A, as explained above, the actual compression ratio is about 11 and the expansion ratio is 11. Compared with this case, in the case shown in FIG. 8B, it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8B is set, while at the time of engine high load operation, the ordinary cycle shown in FIG. 8A is set. This is the basic feature of the present invention.

Next, the operational control as a whole will be explained with reference to FIG. 9.

Figure 9:
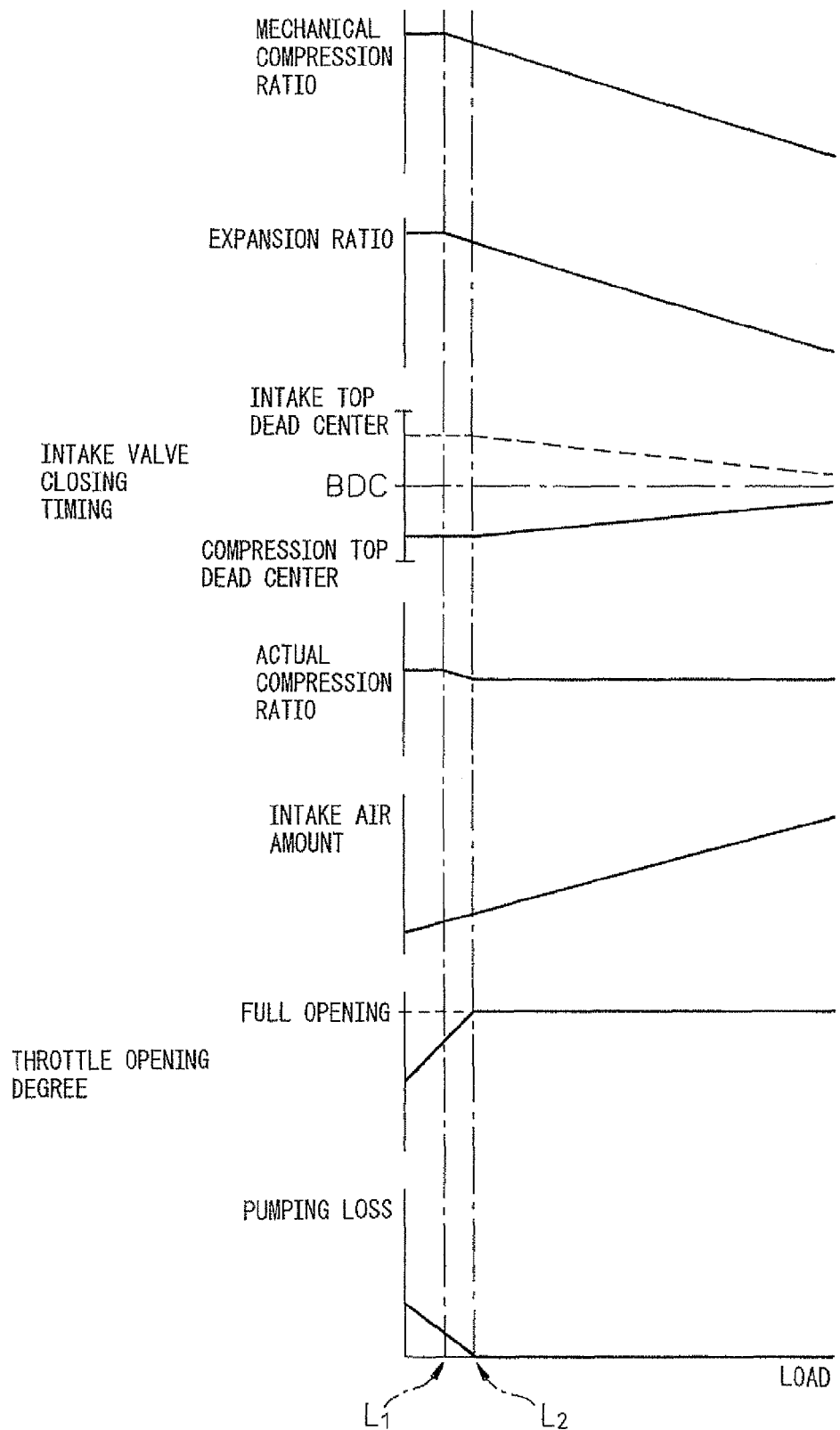
FIG. 9 is a view showing changes in the mechanical compression ratio, etc. in accordance with the engine load.

FIG. 9 shows the changes in the mechanical compression ratio, the expansion ratio, the closing timing of the intake valve 7, the actual compression ratio, the amount of intake air, the opening degree of the throttle valve 17, and the pumping loss according to the engine load. Note that in the embodiments according to the present invention, to enable the three-way catalyst in the catalytic converter 25 to simultaneously reduce the unburned HC, CO, and $NO_X$ in the exhaust gas, ordinarily the average air-fuel ratio in the combustion chamber 5 is feedback controlled to the stoichiometric air-fuel ratio based on the output signal of the air-fuel ratio sensor 26.

As explained above, at the time of engine high load operation, the ordinary cycle shown in FIG. 8A is executed. Therefore, as shown in FIG. 9, at this time, the mechanical compression ratio is made low and, as shown by the solid line in FIG. 9, the closing timing of the intake valve 7 is advanced. Further, at this time, the opening degree of the throttle valve 17 is maintained fully opened or substantially fully opened so that the pumping loss becomes zero.

On the other hand, as shown in FIG. 9, along with the reduction in the engine load, the mechanical compression ratio is increased, therefore the expansion ratio is also increased. Further, at this time, the actual compression ratio is held substantially constant by, as shown by the solid line in FIG. 9, retarding the closing timing of the intake valve 7 as the engine load becomes lower. Note that at this time as well, the throttle valve 17 is held at the fully opened or substantially fully opened state, therefore the amount of intake air fed to the combustion chamber 5 is controlled not by the throttle valve 17 but by changing the closing timing of the intake valve 7. At this time as well, the pumping loss becomes zero.

In this way, when the engine load becomes lower from the engine high load operation state, the mechanical compression ratio is increased along with the reduction in the intake air amount under a substantially constant actual compression ratio. That is, the volume of the combustion chamber 5 when the piston 4 reaches compression top dead center is reduced proportionally to the reduction in the intake air amount. Therefore, the volume of the combustion chamber 5 when the piston 4 reaches compression top dead center changes in proportion to the intake air amount. Note that, at this time, the air-fuel ratio in the combustion chamber 5 becomes the stoichiometric air-fuel ratio, so the volume of the combustion chamber 5 when the piston 4 reaches compression top dead center changes in proportion to the amount of fuel.

If the engine load becomes further lower, the mechanical compression ratio is further increased. If the mechanical compression ratio reaches the limit mechanical compression ratio serving as the structural upper limit of the combustion chamber 5, in the region where the load is lower than the engine load $L_1$ when the mechanical compression ratio reaches the limit mechanical compression ratio, the mechanical compression ratio is held at the limit mechanical compression ratio. Therefore, at the time of engine low load operation, the mechanical compression ratio becomes maximum and the expansion ratio also becomes maximum. In other words, in the present invention, at the time of engine low load operation, the mechanical compression ratio is made maximum so that the maximum expansion ratio is obtained. Further, at this time, the actual compression ratio is maintained at substantially the same actual compression ratio as the time of engine medium and high load operation.

On the other hand, as shown by the solid lines in FIG. 9, the closing timing of the intake valve 7 is retarded along with the drop in the engine load until the limit closing timing at which the amount of intake air supplied in the combustion chamber 5 can be controlled by changing the closing timing of the intake valve 7. In the region where the load is lower than the engine load $L_2$ when the closing timing of the intake valve 7 reaches the limit closing timing, the closing timing of the intake valve 7 is held at the limit closing timing. If the closing timing of the intake valve 7 is held at the limit closing timing, it is necessary to control the intake air amount by some other sort of method since the closing timing of the intake valve 7 can no longer be used to control the intake air amount.

In the embodiment shown in FIG. 9, at this time, that is, in the region of a load lower than the engine load $L_2$ when the closing timing of the intake valve 7 reaches the limit closing timing, the throttle valve 17 is used to control the amount of intake air fed to the combustion chamber 5. However, if the throttle valve 17 is used to control the amount of intake air, as shown in FIG. 9, the pumping loss increases.

Note that in order to prevent such pumping loss from occurring, in the region of a load lower than the engine load $L_2$ when the closing timing of the intake valve 7 reaches the limit closing timing, the air-fuel ratio may be made larger the lower the engine load, in the state holding the throttle valve 17 fully opened or substantially fully opened. At this time, the fuel injector 13 is preferably arranged in the combustion chamber 5 to perform stratified combustion.

As shown in FIG. 9, at the time of engine low speed, regardless of the engine load, the actual compression ratio is held substantially constant. The actual compression ratio at this time is set within the range of about ±10 percent with respect to the actual compression ratio at the time of engine medium and high load operation, preferably ±5 percent. Note that in the present embodiment, the actual compression ratio at the time of engine low speed is made about 10±1, that is, from 9 to 11. However, if the engine speed becomes higher, turbulence occurs in the air-fuel mixture in the combustion chamber 5, and as a result knocking tends to not occur. Therefore, in the embodiment according to the present invention, the higher the engine speed, the higher the actual compression ratio.

On the other hand, as explained above, in the superhigh expansion ratio cycle shown in FIG. 8B, the expansion ratio is made 26. The higher this expansion ratio, the more preferable, but as will be understood from FIG. 7, even for the practically usable lower limit compression ratio $\epsilon=5$, a considerably high theoretical thermal efficiency can be obtained if 20 or more. Therefore, in the present invention, the variable compression ratio mechanism A is formed so that the expansion ratio becomes 20 or more.

Further, in the example shown in FIG. 9, the mechanical compression ratio is changed continuously in accordance with the engine load. However, the mechanical compression ratio can also be changed in stages in accordance with the engine load.

On the other hand, as shown by the broken line in FIG. 9, as the engine load becomes lower, by advancing the closing timing of the intake valve 7 as well, it is possible to control the amount of intake air without changing the opening degree of the throttle valve. Therefore, to comprehensively express both the case shown by the solid line and the case shown by the broken line in FIG. 9, in the embodiment according to the present invention, the closing timing of the intake valve 7 is shifted, as the engine load becomes lower, in a direction away from compression bottom dead center BDC until the limit closing timing $L_2$ enabling control of the amount of intake air fed into the combustion chamber.

Note that, in the above embodiment, the mechanical compression ratio and the closing timing of the intake valve are controlled so as to maintain the actual compression ratio substantially constant regardless of the engine load. However, it is not necessarily required to control these so that the actual compression ratio is maintained substantially constant. Still, even if not controlling the operation to maintain the actual compression ratio substantially constant, basically it is necessary to increase the mechanical compression ratio and move the closing timing of the intake valve away from intake bottom dead center as the engine load becomes lower.

In this regard, most vehicles mounting internal combustion engines are provided with a brake booster 20 or canister (not shown) for purge control. These brake booster 20 and canister utilize negative pressure for their operation. For example, the brake booster 20 utilizes the differential pressure between the negative pressure in the brake booster 20 and atmospheric pressure to increase the depression force applied to the brake pedal 21. The negative pressure in the brake booster 20 is reduced each time the brake pedal 21 is depressed. Usually, if the negative pressure in the brake booster 20 is reduced, the negative pressure is replenished from the negative pressure generating source. Note that, below, the explanation is given using a brake booster 20 as the device utilizing negative pressure.

Normally, a brake booster 20 or other device utilizing negative pressure utilizes as such a negative pressure generating source the negative pressure generated in the engine intake passage at a downstream side of the throttle valve 17, for example, the negative pressure generated in the surge tank 12. That is, in an ordinary internal combustion engine, even at the time of engine low or medium load operation, the engine is operated not by a superhigh expansion ratio cycle, but a normal cycle. In this way, when operated by a normal cycle, the amount of intake air to the combustion chamber 5 is basically controlled by the throttle valve 17. Therefore, at the time of engine low and medium load operation, the opening degree of the throttle valve 17 is made smaller. For this reason, even at the time of engine low load operation, a large negative pressure is generated in the surge tank 12.

In this regard, if controlling the mechanical compression ratio, the closing timing of the intake valve 7, the throttle opening degree, etc. as shown in FIG. 9, at the time of engine low and medium load operation, the amount of intake air supplied in the combustion chamber 5 is controlled by the closing timing of the intake valve 7 and is not controlled by the throttle valve 17. For this reason, the throttle valve 17 is basically fully opened. Therefore, a large negative pressure is not generated in the surge tank 12. Further, in the region where the load is lower than the engine load $L_2$ when the closing timing of the intake valve 7 reaches the limit closing timing, as explained above, the closing timing of the intake valve 7 is maintained at the limit closing timing and the amount of intake air supplied into the combustion chamber 5 is controlled by the throttle valve 17. However, even in this region, the opening degree of the throttle valve 17 is not made small, for example, enough for generating the negative pressure required by the brake booster 20, in the surge tank 12 and therefore sufficient negative pressure is not generated in the surge tank 12.

Therefore, as shown in FIG. 9, if controlling the mechanical compression ratio, closing timing of the intake valve 7, throttle opening degree, etc., it is not possible to generate sufficient negative pressure for suitably operating the brake booster 20 etc. in the surge tank 12 at the time of engine low and medium load. Therefore, to suitably operate the brake booster 20 etc., in particular, at the time of engine low and medium load operation, it becomes necessary to control the operation so as to generate negative pressure. Therefore, in this embodiment of the present invention, as explained below, the throttle opening degree etc. are controlled so as to generate negative pressure in the surge tank 12 so as to enable suitable operation of the brake booster 20 even at the time of engine low and medium load operation.

Here, the brake booster 20 and other devices utilizing negative pressure do not always require a constant or higher negative pressure. For example, if taking as an example the brake booster 20, only when the pressure in the brake booster 20 rises to a certain value or more due to assisting the depression operation of the brake pedal 21, that is, when the negative pressure in the brake booster 20 falls to a certain value or less, it becomes necessary to supply negative pressure in the brake booster 20 so as to restore the negative pressure in the brake booster 20. That is, in the brake booster 20 and other devices utilizing negative pressure, negative pressure is not required constantly. Negative pressure is required intermittently.

Therefore, in an embodiment according to the present invention, negative pressure is generated in the surge tank 12 only when there is a request for negative pressure from the brake booster 20. Specifically, when there is a negative pressure request by the brake booster 20 etc., the throttle opening degree is made smaller so that a reference negative pressure (requested negative pressure) or higher negative pressure is generated in the surge tank 12, that is, the pressure in the surge tank 12 becomes the reference pressure (pressure corresponding to reference negative pressure) or less. Due to this, the negative pressure in the surge tank 12 increases and, as a result, negative pressure is supplied to the brake booster 20.

However, if only reducing the throttle opening degree in this way, the amount of intake air supplied in the combustion chamber 5 ends up being reduced and it becomes impossible to obtain a sufficient engine output for dealing with the engine load. Therefore, in the embodiment of the present invention, the throttle opening degree is reduced and simultaneously the closing timing of the intake valve 7 is advanced, that is, is moved so as to approach intake bottom dead center. By advancing the closing timing of the intake valve 7 in this way, the amount of intake air supplied in the combustion chamber 5 is increased. Therefore, it is possible to make up for the intake air decreased due to reduction of the throttle opening degree. In other words, in the embodiment of the present invention, when the engine load is constant, the closing timing of the intake valve 7 is advanced so that the amount of intake air supplied in the combustion chamber 5 does not change between before and after reducing the throttle opening degree.

By controlling the throttle opening degree and closing timing of the intake valve 7 in this way, when there is a negative pressure request from the brake booster 20 etc., it is possible to make the amount of intake air supplied into the combustion chamber 5 a suitable value corresponding to the engine load etc. and suitably generate negative pressure in the surge tank 12.

In this regard, if controlling the throttle opening degree and the closing timing of the intake valve 7 in this way, the temperature of the air-fuel mixture in the combustion chamber 5 when the piston reaches compression top dead center, that is, the compression end temperature, becomes higher. This will be specifically explained with reference to FIG. 10A and FIG. 10B.

Figure 10A:
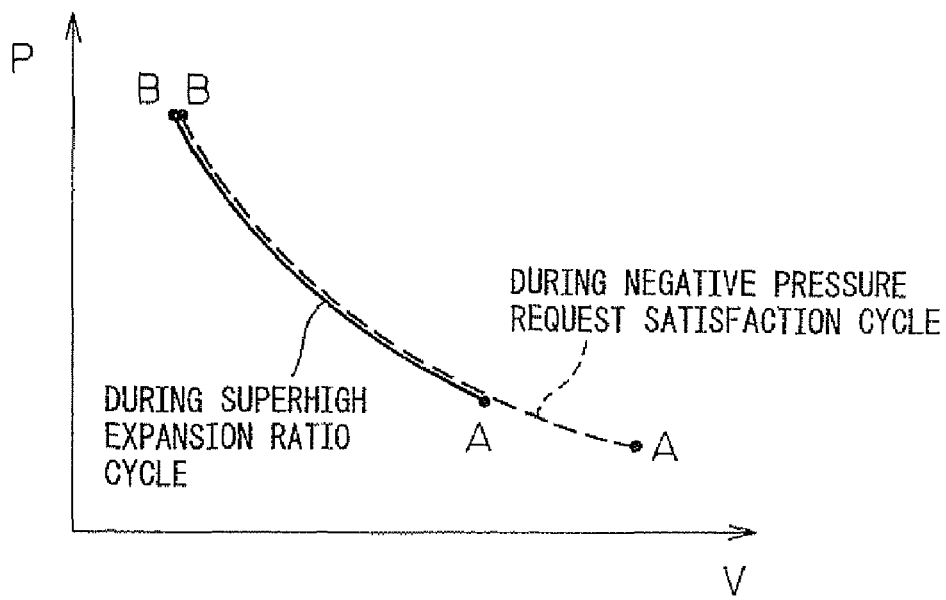
FIG. 10A and FIG. 10B are views for explaining the relationship between a throttle opening degree and closing timing of an intake valve and a compression end temperature.
Figure 10B:
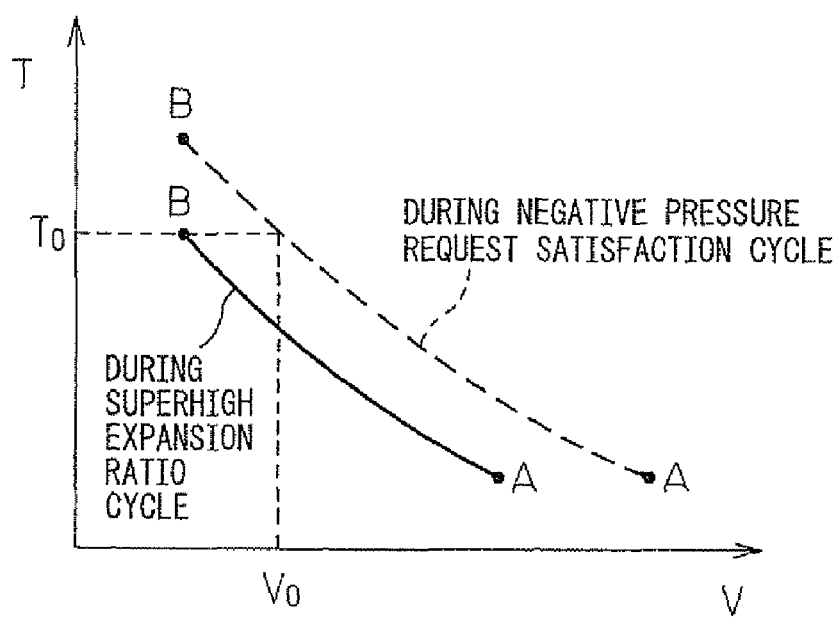

FIG. 10A is a PV graph showing the trends in the volume and pressure of air (or air-fuel mixture) in the combustion chamber 5 during the compression stroke, while FIG. 10B is a view showing the trends in the volume and temperature of the air in the combustion chamber 5 during the compression stroke. The solid lines in the figure show the relationships when operating the internal combustion engine by the superhigh expansion ratio cycle during engine low load operation. On the other hand, the broken lines in the figure show the relationships of the case when increasing the negative pressure in the engine intake passage during engine low load operation by reducing the throttle opening degree and advancing the closing timing of the intake valve 7 (hereinafter referred to as the "negative pressure request satisfaction cycle") compared with the case of operation of the internal combustion engine by the superhigh expansion ratio cycle.

Compared with during the superhigh expansion ratio cycle shown by the solid line in FIG. 10A, during the negative pressure request satisfaction cycle shown by the broken line, the pressure of the air in the combustion chamber 5 at the compression action start point A is low and the volume of the air in the combustion chamber 5 is small. In this way, the pressure of the air in the combustion chamber 5 is low at the compression action start point because during the negative pressure request satisfaction cycle, the small throttle opening degree results in a large negative pressure in the surge tank 12 and in the intake branch tube 11. On the other hand, the volume of the air in the combustion chamber 5 at the compression action start point is large because during the negative pressure request satisfaction cycle, the closing timing of the intake valve 7 is advanced.

However, when the mechanical compression ratio is the same, the volume of air in the combustion chamber 5 at the compression action end point B becomes the same during the superhigh expansion ratio cycle and during the load request satisfaction cycle as shown in FIG. 10A. Further, as explained above, in the present embodiment, the closing timing of the intake valve 7 is controlled so that the amount of intake air supplied in the combustion chamber 5 does not change between before and after reducing the throttle opening degree, so even during the load request satisfaction cycle, the combustion chamber 5 is filled with the same amount of air as during the superhigh expansion ratio cycle, so the pressure of the air in the combustion chamber 5 at the compression action end point B becomes substantially the same during the superhigh expansion ratio cycle and during the load request satisfaction cycle as shown in FIG. 10A.

On the other hand, as shown in FIG. 10B, the temperature of the air in the combustion chamber 5 at the compression action start point A is substantially equal in the superhigh expansion ratio cycle and the negative pressure request satisfaction cycle. However, in the negative pressure request satisfaction cycle, the period during which the compression action is performed is longer than that in the superhigh expansion ratio cycle, so as shown in FIG. 10B, the temperature of the air in the combustion chamber 5 at the compression action end point B, that is, the compression end temperature, during the negative pressure request satisfaction cycle, becomes higher than the compression end temperature during the superhigh expansion ratio cycle. Here, in the superhigh expansion ratio cycle, the operation is controlled so that the compression end pressure or compression end temperature becomes as high as possible within the range where no knocking occurs, so if the compression end temperature becomes higher than during the superhigh expansion ratio cycle, knocking will end up occurring in some cases.

Therefore, in the embodiment of the present invention, the mechanical compression ratio during the negative pressure request satisfaction cycle is reduced so that the compression end temperature becomes the same extent as during the superhigh expansion ratio cycle even during the negative pressure request satisfaction cycle. For example, in the example shown in FIG. 10A and FIG. 10B, the volume when the piston 4 is at compression top dead center (in the illustrated example, $V_0$) is determined so that the compression end temperature during the negative pressure request satisfaction cycle becomes substantially the same temperature as the compression end temperature $T_0$ during the superhigh expansion ratio cycle. The mechanical compression ratio is determined along with this.

Due to the above, in the embodiment of the present invention, when there is a negative pressure request from the brake booster etc., the throttle opening degree is made smaller so that the negative pressure in the surge tank becomes the reference negative pressure or more, the closing timing of the intake valve 7 is controlled so that an amount of intake air corresponding to the engine load is supplied into the combustion chamber 5 in accordance with the throttle opening degree, and further the mechanical compression ratio is controlled so that the compression end temperature becomes substantially equal before and after changing the throttle opening degree and closing timing of the intake valve 7.

Figure 11:
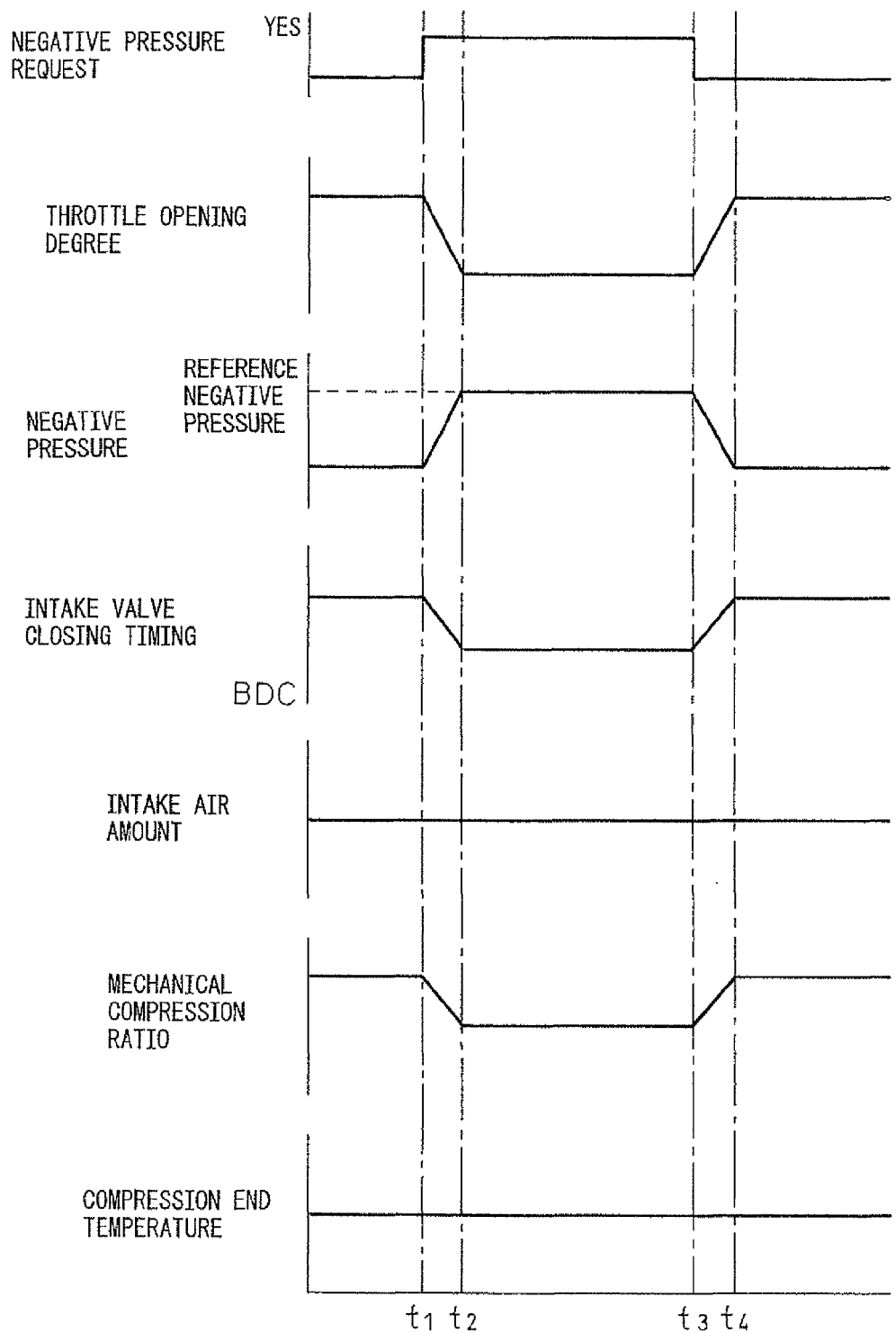
FIG. 11 is a view showing changes in a throttle opening degree etc. when there is a negative pressure request.

Next, referring to FIG. 11, the control when there is a negative pressure request will be explained. FIG. 11 shows the change in the throttle opening degree, the negative pressure in the surge tank 12, the closing timing of the intake valve 7, the intake air amount, and the mechanical compression ratio when there is a negative pressure request.

In the example shown in FIG. 11, at the time $t_1$, for example, there is a negative pressure request from the brake booster 20. If there is a negative pressure request in this way, the throttle opening degree is lowered and the negative pressure inside the surge tank 12 is increased along with a drop in the throttle opening degree. Further, along with the drop in the throttle opening degree, the closing timing of the intake valve 7 is advanced. Due to this, the intake air amount is maintained constant. Furthermore, along with the drop in the throttle opening degree and advance in the closing timing of the intake valve 7, the mechanical compression ratio is reduced. Due to this, the compression end temperature is also maintained constant.

After this, when the negative pressure in the surge tank 12 reaches the reference negative pressure (time $t_2$), the throttle opening degree, the closing timing of the intake valve 7, and the mechanical compression ratio are maintained as they are. Due to this, the intake air amount and compression end temperature are maintained constant in the state with only the negative pressure in the surge tank 12 high. During this time, the negative pressure in the brake booster 12 is increased.

Further, if the negative pressure in the brake booster 12 becomes sufficiently high, there will no longer be any negative pressure request from the brake booster 12 (time $t_3$). If there is no longer any negative pressure request in this way, the throttle opening degree is increased, the closing timing of the intake valve 7 is retarded, and the mechanical compression ratio is increased so that these throttle opening degree, closing timing of the intake valve 7, and mechanical compression ratio are returned to the state before the negative pressure request (time $t_4$).

Note that, in the above embodiment, the throttle opening degree etc. are controlled so that when there is a negative pressure request, the negative pressure in the surge tank 12 always rises to a certain reference negative pressure. However, for example, the extent of the negative pressure required for each device utilizing negative pressure differs. Therefore, it is also possible to change the target negative pressure in the surge tank 12 for each device utilizing negative pressure making a negative pressure request. Further, even with the same device utilizing negative pressure, the extent of the negative pressure required will sometimes differ depending on the engine operating state, therefore it is also possible to change the target negative pressure in the surge tank 12 in accordance with the extent of negative pressure required by the device.

Further, in the above embodiment, the mechanical compression ratio is changed so that the compression end temperature becomes constant when there is a request for negative pressure. However, when controlling the mechanical compression ratio so that the compression end temperature becomes constant, as will be understood from FIG. 10A and FIG. 10B, when changing from the superhigh expansion ratio cycle to the negative pressure request satisfaction cycle, the pressure in the combustion chamber 5 when the piston is at compression top dead center (compression end pressure) falls (that is, the pressure when the volume in the combustion chamber 5 is $V_0$ is smaller than the pressure at the compression end point B). Therefore, even if controlling the mechanical compression ratio so that the compression end temperature at the time of the negative pressure request satisfaction cycle becomes slightly higher than that at the time of the superhigh expansion ratio cycle, knocking dues not occur during the negative pressure request satisfaction cycle. Therefore, if controlling the mechanical compression ratio so that knocking does not occur during the negative pressure request satisfaction cycle, it is also possible not to control the mechanical compression ratio so that the compression end temperature becomes constant during the superhigh expansion ratio cycle and during the negative pressure request satisfaction cycle but to raise the compression end temperature at the time of the negative pressure request satisfaction cycle to more than that at the time of the superhigh expansion ratio cycle (note that, at this time, it is necessary to make the compression end pressure smaller than the pressure at the above compression end point B).

Furthermore, the above embodiment shows the case in an internal combustion engine having a variable compression ratio mechanism where both control of the closing timing of the intake valve and control of the mechanical compression ratio are performed. However, the control of the closing timing of the intake valve does not necessarily have to be performed together with control of the mechanical compression ratio. If controlling the closing timing of the intake valve so that when there is a negative pressure request, the throttle opening degree is made smaller so that the negative pressure in the surge tank becomes the reference negative pressure or more and so that an amount of intake air in accordance with the engine load is supplied in the combustion chamber in accordance with the throttle opening degree, it also becomes possible to apply the invention to an internal combustion engine with no variable compression ratio mechanism.

FIG. 12 is a flowchart showing a control routine of negative pressure generation control. First, at step S10, the booster negative pressure in the brake booster 20, the intake negative pressure in the surge tank 12, and the engine load are detected by the negative pressure sensor 22 provided at the brake booster 20, the pressure sensor 23 provided at the surge tank 12, and the load sensor 41, respectively. Next, at step S11, it is judged if the booster negative pressure detected by the negative pressure sensor 22 is smaller than the limit negative pressure. Here, the "limit negative pressure" is the negative pressure where if the negative pressure inside the brake booster 20 falls any further, the boosting action of the brake booster 20 will become no longer sufficient. When it is judged at step S11 that the booster negative pressure is the limit negative pressure or more, the control routine is ended.

On the other hand, at step S11, when it is judged that the booster negative pressure is smaller than the limit negative pressure, the routine proceeds to step S12. At step S12, it is judged if the intake negative pressure detected by the pressure sensor 23 is lower than the above reference negative pressure. When it is judged that the detected intake negative pressure is the reference negative pressure or more, the control routine is ended. On the other hand, when it is judged that the detected intake negative pressure is lower than the above reference negative pressure, that is, when there is a negative pressure request, the routine proceeds to step S13.

Figure 13A:
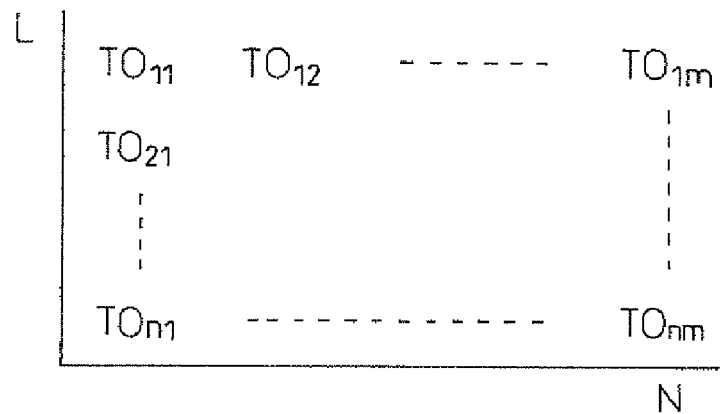
FIG. 13A to FIG. 13C are views showing a target throttle opening degree etc.

At step S13, the target throttle opening degree TO is calculated by using, for example, the map shown in FIG. 13A. That is, the throttle opening degree necessary for making the negative pressure in the surge tank 12 the reference negative pressure or more is stored as a function of the engine load L and engine speed N in the form of the map shown in FIG. 13A in advance in the ROM 32. From this map, the target throttle opening degree TO is calculated.

Figure 13B:
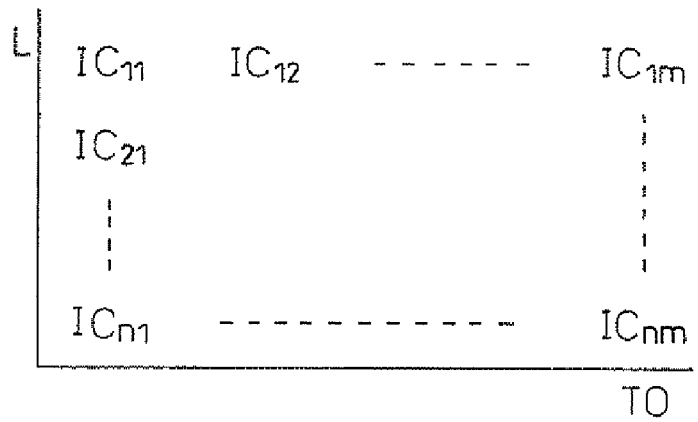
Figure 13C:
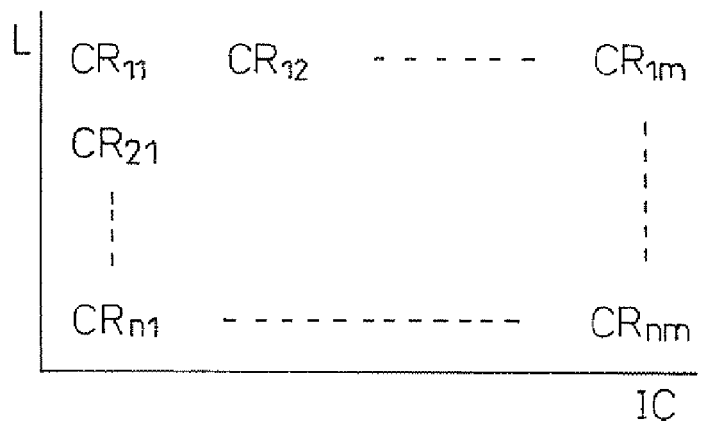

Next, at step S14, the target closing timing IC of the intake valve 7 is calculated by using, for example, the map shown in FIG. 13B. That is, the target closing timing IC of the intake valve 7 required for making the amount of intake air supplied in the combustion chamber 5 the amount according to the engine load is stored as a function of the engine load L and target throttle opening degree TO in the form of the map shown in FIG. 13B in advance in the ROM 32. From this map, the target closing timing IC of the intake valve 7 is calculated. At step S15, the target mechanical compression ratio CR is calculated by using, for example, the map shown in FIG. 13C. That is, the mechanical compression ratio CR required for making the compression end temperature constant is stored as a function of the engine load L and the closing timing IC of intake valve 7 in the form of a map as shown in FIG. 13C in advance in the ROM 32. From this map, the target mechanical compression ratio CR is calculated.

Next, at step S16, the variable compression ratio mechanism A is controlled so the mechanical compression ratio becomes the target mechanical compression ratio CR, the variable valve timing mechanism B is controlled so that the closing timing of the intake valve 7 becomes the target closing timing IC, and the throttle valve 17 is controlled so that the throttle opening degree becomes the target throttle opening degree TO.

Note that, the present invention has been explained in detail based on specific embodiments, but a person skilled in the art could make various changes, modifications, etc. without departing from the claims and idea of the present invention.

LIST OF REFERENCE NUMERALS

1 . . . crank case
2 . . . cylinder block
3 . . . cylinder head
4 . . . piston
5 . . . combustion chamber
7 . . . intake valve
70 . . . cam shaft for driving intake valves
A . . . variable compression ratio mechanism
B . . . variable valve timing mechanism

The invention claimed is:
1. A spark ignition type internal combustion engine provided with a variable valve timing mechanism able to control the closing timing of the intake valve and a variable compression ratio mechanism able to change the mechanical compression ratio, wherein
when a negative pressure in an engine intake passage is smaller than a requested negative pressure, an opening degree of a throttle valve is made smaller so that the negative pressure in the engine intake passage becomes the requested negative pressure or more and the closing timing of the intake valve is moved in a direction approaching intake bottom dead center so that an amount of intake air corresponding to the engine load is supplied in the combustion chamber in accordance with the opening degree of the throttle valve and also the mechanical compression ratio is made smaller to lower the compression end pressure.

2. A spark ignition type internal combustion engine as set forth in claim 1, wherein the mechanical compression ratio in the case where the negative pressure in the engine intake passage becomes the requested negative pressure or more due to reduction of the opening degree of the above throttle valve is made smaller than the case where the negative pressure in the engine intake passage is smaller than the requested negative pressure.

3. A spark ignition type internal combustion engine as set forth in claim 2, wherein the mechanical compression ratio in the case where the negative pressure in the engine intake passage becomes the requested negative pressure or more due to reduction of the opening degree of the above throttle valve is set so that the compression end temperature becomes substantially the same as the compression end temperature in the case where the negative pressure in the engine intake passage is smaller than the requested negative pressure.

4. A spark ignition type internal combustion engine as set forth in claim 1, wherein when the negative pressure in the engine intake passage is the requested negative pressure or more, the expansion ratio is 20 or more at the time of engine low load operation.

5. A spark ignition type internal combustion engine as set forth in claim 1, wherein the actual compression ratio at the time of engine low load operation is made substantially the same compression ratio as the time of engine medium and high load operation.

6. A spark ignition type internal combustion engine as set forth in claim 1, wherein when the negative pressure in the intake passage is the requested negative pressure or more, the closing timing of the intake valve is made to move in a direction away from intake bottom dead center until the limit closing timing able to control the amount of intake air supplied in the combustion chamber along with a reduction in the engine load.

7. A spark ignition type internal combustion engine as set forth in claim 6, wherein in the region where the load is higher than the engine load when the closing timing of the intake valve reaches the above limit closing timing, the amount of intake air supplied in the combustion chamber is controlled not by the throttle valve, but by changing the closing timing of the intake valve.

8. A spark ignition type internal combustion engine as set forth in claim 7, wherein in the region where the load is higher than the engine load when the closing timing of the intake valve reaches the above limit closing timing, the above throttle valve is held in the fully opened state.

9. A spark ignition type internal combustion engine as set forth in claim 7, wherein in the region where the load is lower than the engine load when the closing timing of the intake valve reaches the above limit closing timing, the amount of intake air supplied in the combustion chamber is controlled by the above throttle valve.

10. A spark ignition type internal combustion engine as set forth in claim 1, wherein when the negative pressure in the engine intake passage is the requested negative pressure or more, the mechanical compression ratio is made the maximum mechanical compression ratio at the time of engine low load operation.

* * * * *